July 20, 1943.　　　　C. A. DANBERG　　　　2,324,828
STORAGE BATTERY CABLE CONNECTOR
Filed June 4, 1941
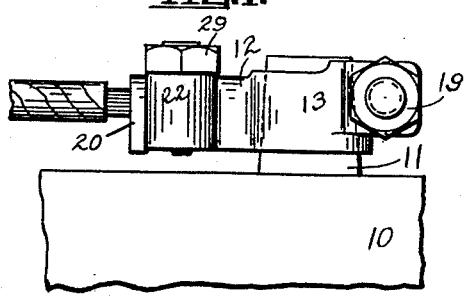
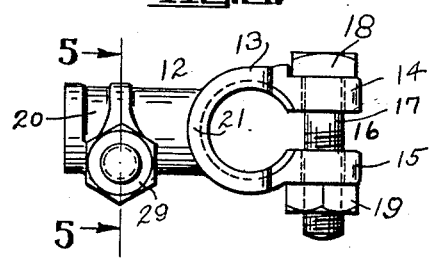
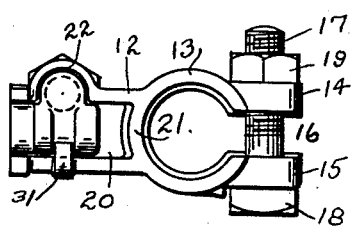
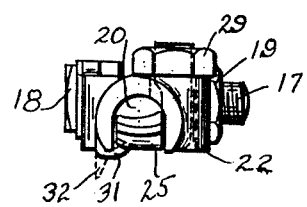
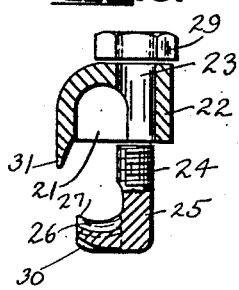
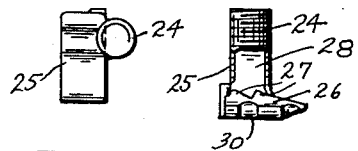
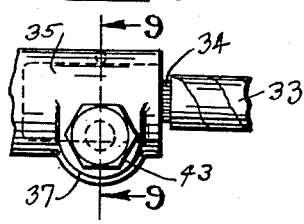
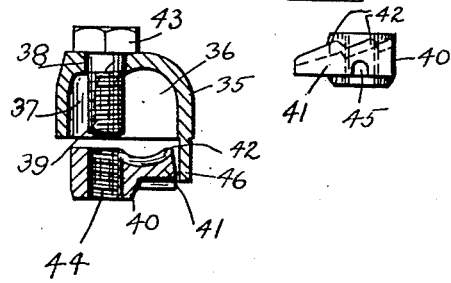
INVENTOR
*Charles A. Danberg.*
BY
*H. G. Manning*
ATTORNEY Patented July 20, 1943

2,324,828

UNITED STATES PATENT OFFICE 2,324,828

STORAGE BATTERY CABLE CONNECTOR

Charles A. Danberg, Berlin, Conn.

Application June 4, 1941, Serial No. 396,567

2 Claims. (Cl. 173—259)

This invention relates to storage batteries and more particularly to a device for connecting a terminal post of such a battery to an electric cable.

One object of this invention is to provide a storage battery terminal and cable connector of the above nature which will avoid the use of solder and yet will provide a strong and secure grip upon the terminal and cable engaged thereby.

A further object is to provide a connector of the above nature including an open casing and employing a clamping nut for the cable, which is located on top of the casing instead of on the side, as was common in previous conductors of this general type.

A still further object of the invention is to provide a battery connector of the above nature having a detachable clamping shoe located in the casing and having locking means located on the bottom of the casing which is adapted to be bent into a recess formed in said clamping shoe.

A still further object is to provide a battery terminal and cable connector of the above nature which will be simple in construction, inexpensive to manufacture, readily accessible, subject to the minimum amount of corrosion, compact, ornamental in appearance, and very efficient and durable in use.

With these and other objects in view, there have been illustrated on the accompanying drawing two forms in which the invention may be conveniently embodied in practice.

In the drawing:

Figure 1 represents a side view of one form of the improved battery terminal and cable connector as it appears when assembled upon a storage battery.

Figure 2 is a top view of the same.

Figure 3 is a bottom view of the same.

Figure 4 is an end view of the same, looking from the left of Figure 2.

Figure 5 is a sectional view of the same, taken on the line 5—5 of Figure 2, looking in the direction of the arrows.

Figure 6 is a top view of the cable clamping shoe member employed in the first form of the invention.

Figure 7 is a side view of the same.

Figure 8 is a top view of the cable clamping end of a modified form of battery connector as it appears in use when attached to a stranded cable.

Figure 9 is a sectional view of the same, taken on the line 9—9 of Figure 8, looking in the direction of the arrows.

Figure 10 is a side view of the modified cable clamping shoe member employed in the second form of the invention.

In the former types of storage battery terminal connectors of the solderless style, the bared end of a stranded cable was usually clamped in the closed cylindrical casing of a cable connector which was expensive to manufacture in view of the fact that a core was necessary in the molding process. By means of the present invention, the above and other disadvantages have been overcome, and a cable connector has been provided which has an open casing for receiving a detachable cable clamping shoe, the latter being held in position by a nut located upon the top of the casing. By means of this construction, the clamping shoe is enabled to obtain a better grip upon and more frictional contact with the cable, resulting in less heating of the connector due to a material reduction of the current leakage.

A further feature of advantage is that the separate clamping shoe may be permanently held from falling out of the connector by means of a pin formed as an integral part of the open socket within which the shoe is received, which pin is adapted to be bent over into a recess formed on the bottom exterior surface of the clamping shoe.

Referring now to the drawing in which like reference numerals denote corresponding parts throughout the several views, the numeral 10 indicates a storage battery having a tapered terminal post 11 upon which the improved cable connector 12 is adapted to be clamped.

The cable connector comprises a split tubular vertical casing 13 which is substantially cylindrical in form and is provided with a pair of tapered apertured post-clamping jaws 14 and 15, separated by a slot 16 so as to provide a resilient construction.

Provision is also made of a horizontal bolt 17 having a head 18, the threaded shank of which is adapted to pass loosely through the apertures in the jaws 14 and 15.

In order to tightly clamp the casing 13 upon the tapered post 11 of the battery 10, a nut 19 screwed upon the outer end of the bolt 17 will be tightly engaged against the jaw 15 by means of a wrench, not shown.

The connector 12 is provided at its other end, opposite from the post engaging casing 13, with a longitudinal horizontal socket 20 which is open at its bottom end for receiving the bared strands 34 of an insulated cable 33. The cable socket 20 is spaced from the post receiving casing 13 by a partition 21, and said socket 20 is provided with a transverse side bore 22 having a vertical axis located at right angles to the axis of the longitudinal socket 20.

At the upper base of the side bore 22, provision is made of an aperture 23 for loosely receiving a threaded shank 24 of a cable clamping shoe member 25, which shank extends upwardly through the top of the socket 20 and is adapted to seat against the flat outer surface of said socket to clamp the shoe tightly in strong frictional engagement against the strands 34 of the cable 33. The shoe member 25 is angular in shape and is provided with a concave cable engaging surface 26 having transverse teeth 27 formed thereon. The inside portion of the threaded shank 24 of the shoe is cut away to provide a flat surface 28 to provide for better gripping engagement upon the stranded cable when a nut 29 is screwed tightly on the shank 24.

In order to permanently lock the shoe in clamping position within the connector socket 20, the bottom surface of said shoe is provided with a transverse recess 30 into which a pin member 31, integral with the casing 13, is adapted to be bent over from the dotted line position 32 to the full line position shown in Figure 4. After the pin 31 has been bent into locking position, the final clamping action upon the cable 34 will be produced by tightening the nut 29 against the adjacent flat exterior surface of the top of the socket bore 22.

*Modified form*

The modified form of the invention shown in Figures 9 and 10 is similar to that shown in the first form, except that the open cable socket 35 is provided with a longitudinal bore 36 which is slightly wider than the longitudinal bore of the first form, and in which a transverse bore 37 is provided having a somewhat larger radius than in the first form. The base of the transverse bore is also provided with an aperture 38 which serves to receive a bolt 39 adapted to pass loosely therethrough.

A modified cable clamping shoe 40 is located in the longitudinal bore 36 and has a concave ear 41 provided with teeth 42 for engaging the strands 34 of the cable 33 as in the first form.

The bolt 39 is provided with a head 43 and the shank of said bolt is adapted to fit into a threaded aperture 44 formed in said shoe 40, serving to tighten the shoe 40 against the cable in cooperation with the head 43 of said bolt.

A recess 45 is provided on the bottom of the shoe 40 for receiving a pin 46 (similar to the pin 31), which is adapted to be bent into the recess 45, in a manner similar to that described in the first form of the invention.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a solderless connector for joining a battery terminal post and an electric cable, a cable socket open at its lower side and at its end to receive said cable either transversely through said open lower side or longitudinally through said open end, a cable clamping shoe loosely mounted inside said socket below said cable, and vertical screw means connecting said socket with said shoe for drawing it upwardly to tightly engage said cable and hold it securely in said socket.

2. In a solderless connector for joining a battery terminal post and an electric cable, a cable socket open at its lower side and at its end to receive said cable either transversely through said open lower side or longitudinally through said open end, a cable clamping shoe loosely mounted inside said socket below said cable, screw means for drawing said shoe upwardly to tightly engage said cable and hold it securely in said socket, and a ductile pin on the exterior of said socket adapted to be bent up under the bottom of said shoe to hold it from falling out of said socket when said screw means is loosened.

CHARLES A. DANBERG.